April 29, 1952 — R. J. CASSIDY — 2,594,730
GENERATOR REGULATOR
Filed Nov. 17, 1949

INVENTOR
ROBERT J. CASSIDY
By Willis, Hardman and Foley
his ATTORNEYS

Patented Apr. 29, 1952

2,594,730

UNITED STATES PATENT OFFICE 2,594,730

GENERATOR REGULATOR

Robert J. Cassidy, Birmingham, Mich., assignor to General Motors Corporation, Detroit, Mich., a corporation of Delaware Application November 17, 1949, Serial No. 127,812

2 Claims. (Cl. 322—28)

This invention relates to the regulation of an alternating current generator driven at variable speed, for example, by the propelling engine of an automotive vehicle and operable to supply, through a rectifier, current for exciting the generator field, for charging a storage battery and for other devices operating on direct current. By regulating the current supplied to the generator field windings, the D. C. output voltage of the rectifier is maintained substantially constant over a relative wide range of operating speeds.

An object of the invention is to enable the generator to put out an A. C. voltage adequate for useful purposes even at speeds lower than possible heretofore thereby avoiding the necessity of using a more expensive generator in order to obtain that adequate voltage at low speeds. For example, an A. C. generator already available for use on passenger busses can be enabled by the use of the present invention to supply A. C. voltage adequate for illumination by fluorescent lamps at lower speed than heretofore possible. In the disclosed embodiment of the invention, this object is accomplished by so modifying the excitation of the magnet coil of the voltage regulator that, when alternating current from the generator is used by the lamps, the voltage which the regulator is set to maintain is increased in consequence of which the regulating resistance is reduced and field current and A. C. voltage are higher than they would be otherwise.

Further objects and advantages of the present invention will be apparent from the following description, reference being had to the accompanying drawing, wherein a preferred embodiment of the present invention is clearly shown.

Figure 1:
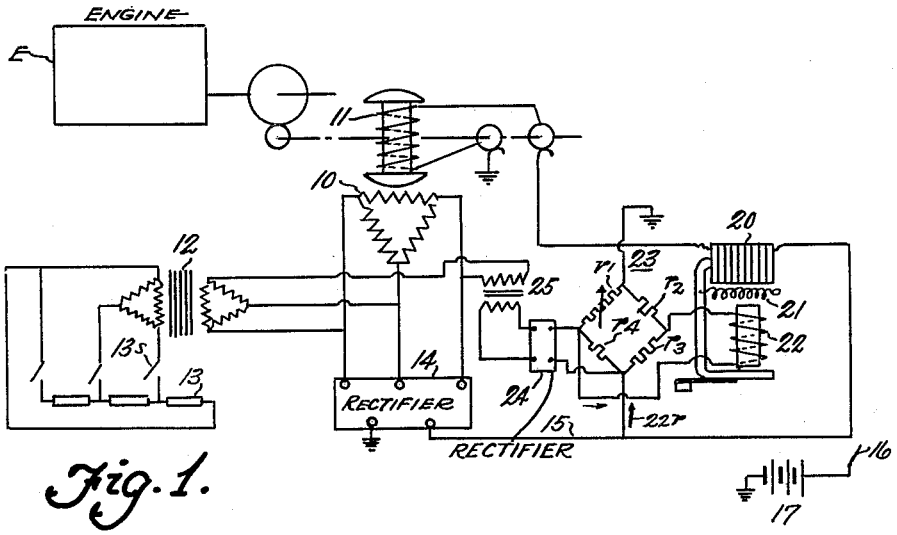
Fig. 1 is a wiring diagram of the invention.

Referring to Fig. 1, an A. C. generator driven by the vehicle engine E has a non-rotating armature 10 and a rotary field excited by coil 11. The terminals of the generator are connected by a transformer 12 and conventional accessories with fluorescent lamps 13 having individual control switches 13s and are connected with the input terminals of a rectifier 14, one D. C. terminal of which is grounded and the other with wire 15 connectible by a manually controlled switch 16 with a storage battery 17.

The D. C. output voltage is regulated by a carbon pile regulator having a stack 20 connected between wire 15 and the field coil 11 and urged into low resistance status by a spring 21 and having a control coil 22 for opposing the action of the spring in order to maintain a desired D. C. voltage.

The action of the regulator is modified, when a lamp 13 is turned on by means comprising a Wheatstone bridge 23 having intermediate terminals connected with coil 22 and having end terminals connected with rectifier 14 and having one leg connected as shown with the output terminals of a rectifier 24, whose input terminals are connected through a transformer 25 with one leg of the A. C. circuit to the lamps 13. The four legs or resistances of the bridge may have, for example, $r_1$ at 400 ohms, $r_2$ at 3.3 ohms, $r_3$ at 50 ohms and $r_4$ at 5 ohms. Resistance $r_1$ may be adjusted to obtain the desired initial unbalance of the bridge so that the voltage impressed on coil 22 will be that required for limiting the voltage output of the rectifier 14 to the proper value when lamps 13 are not used. The direction of current flow to coil 22 is represented by arrows $22r$.

When one or more lamps 13 are switched on, transformer 25 is excited and rectifier 24 impresses a D. C. voltage on resistance $r_4$ in opposition to the voltage impressed thereon by rectifier 14 so that the voltage impressed on coil 22 is less than would exist if the lamps 13 were not burning. Therefore the D. C. output voltage of the rectifier 14 is increased.

Since transformer 25 is a current transformer, the D. C. voltage output of rectifier 24 will be proportional to A. C. used by lamps 13. Therefore the amount of increase in D. C. output voltage of rectifier 14 will be proportional to A. C. used by the lamps.

Figure 2:
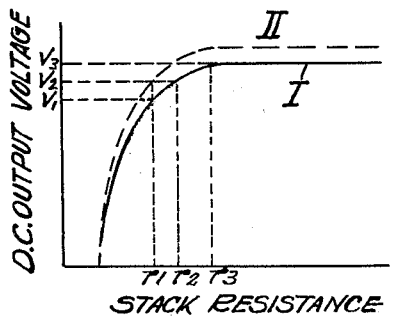
Figs. 2–5 are charts issued in explaining its operation.

Referring to Fig. 2, curve I shows the relation of actual D. C. output voltage to stack resistance required for regulation over the speed range while the generator is not supplying current to the lamps 13. As voltage climbs from zero to $V_3$, the regulating resistance increases to $r_3$. With further increase in speed, the voltage does not increase materially above $V_3$ since the stack resistance is increased further by increased magnetic pull of coil 22. When speed falls below that at which $V_3$ was first attained the output voltage may fall to $V_2$ and the resistance of the stack will decrease to $r_2$. When the speed decreases still further, the output voltage may decrease to $V_1$ and the resistance of the stack will be decreased to $r_1$. Let it be assumed that when the generator is able to produce, through the rectifier 14, a D. C. output voltage $V_2$, the generator A. C. output voltage will be sufficient to maintain the lamps 13. If stack resistance less than $r_2$ were then existing, generator A. C. voltage sufficient to maintain the lamps 13 could be produced at a somewhat lower speed.

Curve II of Fig. 2 shows the characteristic of regulation of D. C. output voltage when the lamps are drawing A. C. from the generator. Since voltage from rectifier 24 bucks voltage from rectifier 14, the D. C. output voltage is greater than that which occurred at the corresponding speeds when regulation is that indicated by curve I. The characteristic of the regulator is now such that D. C. voltage $V_2$ can be maintained with stack resistance $r_1$ instead of $r_2$ as in the case of the characteristic represented by curve I. This means the speed at which the generator can produce A. C. voltage sufficient to maintain the lamps 13 is less because the stack resistance has been reduced to $r_1$ so that field excitation is greater than it would have been if resistance $r_2$ were existing as in the case of curve I.

Figure 3:
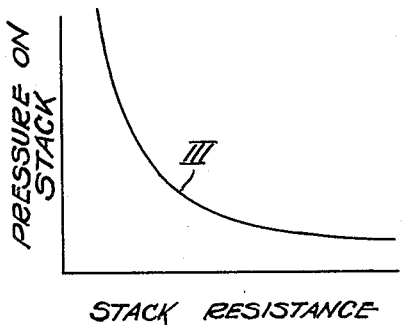
Figure 4:
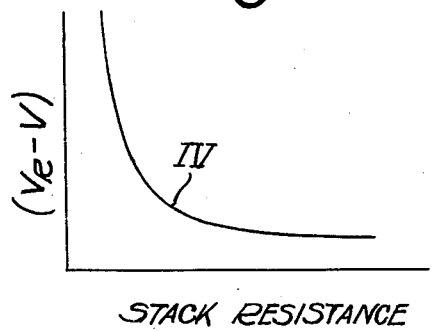

These characteristics are inherent in a carbon pile regulator, there being a spring such as 21 which puts pressure on the stack and a magnet coil such as 22 which takes off the pressure. Curve III of Fig. 3 shows the relation of stack pressure to stack resistance. The pressure on the stack at any instance is equal to difference between the initial force of spring 21 and the pull of the coil 22. The higher the voltage impressed on coil 22, the lower the pressure on the stack. At regulated voltage, there is a balance between spring force and coil magnetic force; and stack pressure can decrease to zero at high speed. Stack resistance is a function of the difference between the voltage at which the regulator is set and the actual voltage impressed on the coil 22. Let the former voltage be $V_R$ and the latter $V$, then it follows that curve IV of Fig. 4 (which is similar to curve III of Fig. 3) represents the relation between $(V_R-V)$ and stack resistance. As $(V_R-V)$ decreases stack resistance increases and vice versa. $V_R$ being a constant, as $V$ increases $(V_R-V)$ decreases. Therefore as $V$ increases, stack resistance increases according to curve I or II of Fig. 2.

Figure 5:
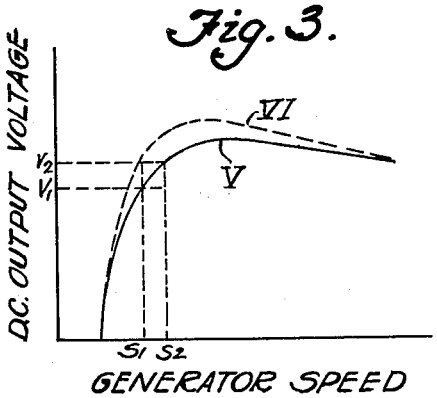

Curve V of Fig. 5 shows the relation of D. C. output voltage $V$ to speed when the regulator modifier is not functioning and curve VI when the modifier is functioning. At speed $s_2$, the D. C. output voltage is $V_2$ when the modifier is not functioning. Speed $s_2$ is the lowest generator speed at which the A. C. voltage will be sufficient to maintain lamp 13 if the modifier is not functioning. At a lower speed $s_1$, the D. C. output voltage is $V_2$ on curve VI when the modifier is functioning by virtue of turning on lamps 13. When the vehicle is being propelled with the transmission in high, at a speed corresponding to which the generator speed is $s_1$, the generator A. C. voltage would be insufficient without the modifier functioning to maintain operation of the fluorescent lamps; but, with the modifier functioning, D. C. voltage $V_2$ exists at speed $s_1$ and calls for lower resistance $r_1$ as shown by curve II (Fig. 2) so that the A. C. voltage is sufficient to maintain these lamps when vehicle speed is that corresponding to generator speed $s_1$ when the transmission is in high.

While the embodiment of the present invention as herein disclosed, constitutes a preferred form, it is to be understood that other forms might be adopted.

What is claimed is as follows:

1. A generating system comprising an A. C. generator driven at variable speed and having a field winding excited by direct current, a device operated by alternating current, means connected with the output terminals of the generator for supplying A. C. to the device said means including a device connecting switch, means supplying direct current to the field winding and including a rectifier having input terminals connected with the generator terminals and D. C. output terminals connected with the field winding, means for regulating the D. C. output of the rectifier and comprising a carbon pile regulator having a stack in the circuit of the field winding, a spring for applying pressure to the stack and an electromagnet opposing the spring and having a coil connected with the D. C. output terminals of the rectifier, a Wheatstone bridge comprising four resistances and having end terminals connected with the rectifier and intermediate terminals connected with the regulator coil, said resistances having values such that a voltage is impressed on the regulator coil by the rectifier, and means rendered effective when by closure of said switch the device receives A. C. from the generator for impressing upon one leg of the bridge a voltage bucking the voltage impressed by the rectifier thereby reducing excitation of the regulator magnet and decreasing stack resistance and increasing A. C. output voltage.

2. A generating system comprising an A. C. generator driven at variable speed and having a field winding excited by direct current, a device operated by alternating current, a voltage transformer having a primary winding connected with the generator terminals and a secondary winding, a switch connecting the secondary winding with the device, means supplying direct current to the field winding and including a rectifier having input terminals connected with the generator terminals and D. C. output terminals connected with the field winding, means for regulating the D. C. output of the rectifier and comprising a carbon pile regulator having a stack in the circuit of the field winding, a spring for applying pressure to the stack and an electromagnet opposing the spring and having a coil connected with the D. C. output terminals of the rectifier, a Wheatstone bridge comprising four resistances and having end terminals connected with the rectifier and intermediate terminals connected with the regulator coil, said resistances having values such that a voltage is impressed on the regulator coil by the rectifier, a current transformer having a primary winding connected in series with a terminal of the primary winding of the voltage transformer and a generator terminal and having a secondary winding, a second rectifier having input terminals connected with the secondary winding of the current transformer and output terminals connected with the ends of one leg of the bridge, whereby, when the device controlling switch is closed, there is impressed upon said leg a voltage bucking the voltage impressed by the rectifier thereby reducing excitation of the regulator magnet and decreasing stack resistance and increasing A. C. output voltage.

ROBERT J. CASSIDY.

REFERENCES CITED

The following references are of record in the file of this patent:

UNITED STATES PATENTS

| Number | Name | Date |
|---|---|---|
| 1,158,001 | Neeley | Oct. 26, 1915 |
| 2,010,571 | Wagner | Aug. 6, 1935 |
| 2,281,034 | Geiselman | Apr. 28, 1942 |